United States Patent
Haubold

(10) Patent No.: US 11,790,426 B2
(45) Date of Patent: *Oct. 17, 2023

(54) GRAPHICAL USER INTERFACE TO DISPLAY INVENTORY DATA AT MERCHANT LOCATIONS

(71) Applicant: Google LLC, Mountain View, CA (US)

(72) Inventor: Alexander Haubold, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/827,040

(22) Filed: Mar. 23, 2020

(65) Prior Publication Data
US 2020/0219162 A1 Jul. 9, 2020

Related U.S. Application Data

(63) Continuation of application No. 15/389,444, filed on Dec. 22, 2016, now Pat. No. 10,600,102.

(51) Int. Cl.
*G06Q 30/00* (2012.01)
*G06Q 30/0601* (2023.01)
(Continued)

(52) U.S. Cl.
CPC ....... *G06Q 30/0625* (2013.01); *G06F 3/0481* (2013.01); *G06Q 10/087* (2013.01);
(Continued)

(58) Field of Classification Search
None
See application file for complete search history.

(56) References Cited

U.S. PATENT DOCUMENTS 4,783,740 A 11/1988 Ishizawa et al.
5,319,544 A 6/1994 Schmerer et al.
(Continued)

FOREIGN PATENT DOCUMENTS

WO WO 2016/077176 5/2016
WO WO2018/118178 A1 6/2018

OTHER PUBLICATIONS

International Search Report on Patentability for PCT/US2017/054115, dated Jul. 4, 2019, 7 pages.
(Continued)

*Primary Examiner* — Naeem U Haq
(74) *Attorney, Agent, or Firm* — Dority & Manning, P.A.

(57) ABSTRACT

A graphical user interface displays inventory data that has been determined based on user supplied data and merchant supplied data. When a user searches for a product on a search engine computing system, the search engine computing system associates the searched items with the user. The search engine computing system logs if a user visits a local merchant location associated with the searched product. The search engine computing system requests inventory data from the user for the product at the local merchant location. The search engine computing system aggregates the user response with other user responses and incorporates the responses with the inventory data provided by the merchant. The inventory display may include one or more inventory metrics to provide more useful inventory data to the user.

20 Claims, 7 Drawing Sheets

(51) Int. Cl.
*G06Q 10/087* (2023.01)
*G06Q 30/0241* (2023.01)
*G06F 3/0481* (2022.01)
*H04L 67/52* (2022.01)

(52) U.S. Cl.
CPC ..... *G06Q 30/0277* (2013.01); *G06Q 30/0641* (2013.01); *H04L 67/52* (2022.05)

(56) References Cited

U.S. PATENT DOCUMENTS

| | | | |
|---|---|---|---|
| 5,644,725 | A | 7/1997 | Schmerer |
| 6,341,271 | B1 | 1/2002 | Salvo et al. |
| 7,225,144 | B2 | 5/2007 | Hashimoto et al. |
| 8,321,302 | B2 | 11/2012 | Bauer et al. |
| 8,661,121 | B1 | 2/2014 | Mendis |
| 8,738,461 | B1 | 5/2014 | Chu et al. |
| 9,316,740 | B2 | 4/2016 | Ghinamo |
| 9,595,038 | B1* | 3/2017 | Cavalcanti ........... G06V 30/424 |
| 2001/0051905 | A1 | 12/2001 | Lucas |
| 2002/0010661 | A1 | 1/2002 | Waddington et al. |
| 2002/0198795 | A1 | 12/2002 | Dorenbosch |
| 2003/0120563 | A1 | 6/2003 | Meyer |
| 2004/0054607 | A1 | 3/2004 | Waddington et al. |
| 2006/0186201 | A1* | 8/2006 | Hart ................... G07C 1/10 235/376 |
| 2007/0203811 | A1* | 8/2007 | Hoopes ................ G06Q 10/087 705/28 |
| 2008/0004038 | A1 | 1/2008 | Dunko |
| 2008/0147518 | A1 | 6/2008 | Haider et al. |
| 2011/0153468 | A1 | 6/2011 | Roethling |
| 2012/0238257 | A1 | 9/2012 | Anson |
| 2013/0066897 | A1* | 3/2013 | Ehrenberg ............. G06Q 10/10 707/769 |
| 2013/0159135 | A1 | 6/2013 | Jones et al. |
| 2013/0260790 | A1 | 10/2013 | Itzhaki et al. |
| 2014/0279241 | A1 | 9/2014 | Bartholomew |
| 2015/0178672 | A1* | 6/2015 | Jones .................. G06Q 10/087 705/28 |
| 2016/0110679 | A1 | 4/2016 | Putnam et al. |
| 2016/0307149 | A1 | 10/2016 | Jones et al. |
| 2016/0350709 | A1 | 12/2016 | Taylor et al. |
| 2018/0114184 | A1 | 4/2018 | Brooks et al. |
| 2018/0260768 | A1 | 9/2018 | Ng et al. |
| 2018/0365616 | A1 | 12/2018 | Taylor et al. |

OTHER PUBLICATIONS

Li et al. "The inventory management system for automobile spare parts in a central warehouse", Expert Systems with Applications 34 (2008) 1144-1153.

Machine Translated Chinese Search Report Corresponding to Application No. 201780077810.9 dated Nov. 18, 2022.

* cited by examiner

GRAPHICAL USER INTERFACE TO DISPLAY INVENTORY DATA AT MERCHANT LOCATIONS

PRIORITY CLAIM

The present application is a continuation of and claims priority to U.S. patent application Ser. No. 15/389,444 having a filing date of Dec. 22, 2016, which is incorporated by reference herein by reference in its entirety.

TECHNICAL FIELD

The present disclosure relates to a graphical user interface that provides inventory data at physical merchant locations. More specifically, a graphical user interface displays inventory data determined based on user supplied data and merchant supplied data.

BACKGROUND

Merchants, both online and offline, typically maintain inventory data for products that are available for sale. Inventory data may be made available to search engines or shopping applications over the Internet. The inventory levels may correspond to products that are in stock at a physical brick and mortar location of a merchant. However, conventional inventory levels provided by the merchants are not corroborated by any external source to improve accuracy and are routinely inaccurate.

For example, an inventory level may not reflect that items have been damaged and taken from the shelf, or placed on the wrong shelf In another example, the inventory system may only rely on received shipments of inventory to log incoming products and transaction data to log outgoing products. This system may accumulate and propagate these errors. These and other sources of inventory inaccuracies are only corrected upon a physical inventory by merchant employees. Depending on the frequency of physical inventories, the inventory errors are displayed to users causing user frustrations. For example, if an inventory system indicates to a user that three units of a product are available for purchase at a merchant location, but the merchant location does not actually have any units for purchase, the user may have wasted a trip and experienced frustration with the merchant location.

SUMMARY

Techniques herein provide graphical user interfaces to display inventory data on user computing devices, the graphical user interfaces being generated in response to search queries. The graphical user interface displays inventory data that has been determined based on user supplied data and merchant supplied data. When a user searches for a product on a search engine computing system, the search engine computing system associates the searched items with the user. The search engine computing system logs if a user visits a local merchant location associated with the searched product. The search engine computing system requests inventory data from the user for the product at the local merchant location. The search engine computing system aggregates the user response with other user responses and incorporates the responses with the inventory data provided by the merchant. The inventory display may include one or more inventory metrics to provide more useful inventory data to the user.

In certain other example aspects described herein, methods, systems, and computer program products to display inventory data on user computing devices in response to search queries are provided.

These and other aspects, objects, features and advantages of the example embodiments will become apparent to those having ordinary skill in the art upon consideration of the following detailed description of illustrated example embodiments.

DETAILED DESCRIPTION

Overview

Figure 1:
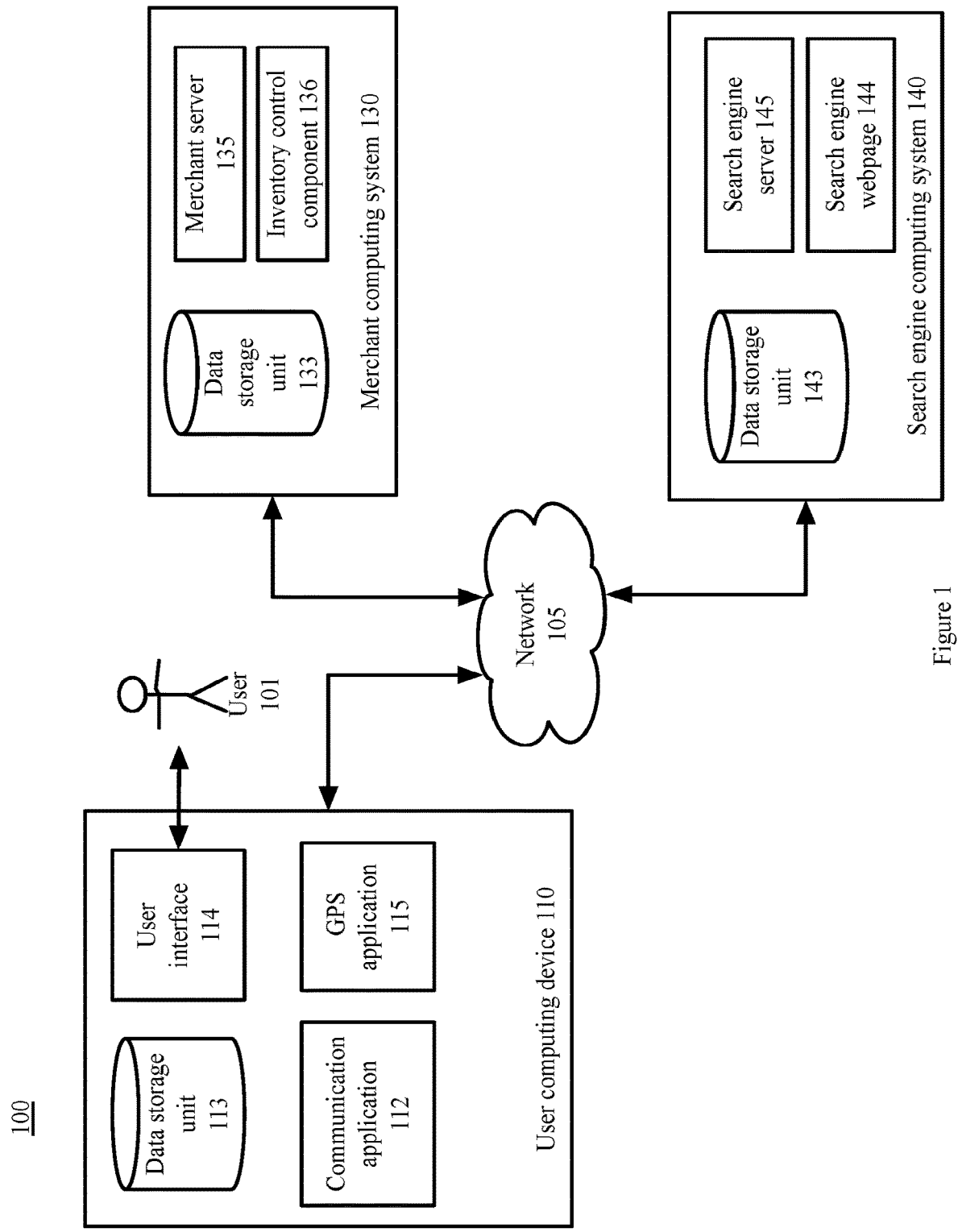
FIG. 1 is a block diagram depicting a system to render graphical user interfaces to display inventory levels at a merchant location, in accordance with certain example embodiments.

A graphical user interface displays inventory data that has been determined based on user supplied data and merchant supplied data. When a user searches for a product on a search engine computing system, the search engine computing system associates the searched items with the user. The search engine computing system detects that a user visits a merchant location associated with the searched product. Upon detecting that the user has visited a merchant location associated with the searched product, the search engine computing system requests inventory data from the user for the product at the merchant location. The search engine computing system aggregates the user response with other user responses and incorporates the responses with the inventory data provided by the merchant. The inventory display may include one or more inventory metrics to provide more useful inventory data to the user.

When a merchant provides inventory data to a search engine computing system, the data is typically based on an inventory management system employed by the merchant. The reality of what is actually available for purchase at the store may differ from the information provided by the merchant computing system. For example, the merchant computing system may indicate that a store has ten units of a tool available for purchase. When a user visits the location to purchase the tool, the user finds that two units are broken, five units are on a shelf that is unreachable, and three units are misplaced three aisles away. Thus, when the user visits the merchant location to purchase the tool, the user experience suggests that the merchant location does not have any of the tools available.

The search engine computing system provides a questionnaire, survey, or other request for information to a user that has searched for a product and is detected to be at the associated merchant location. For example, the search engine computing system provides a pop-up advertisement with the request to the user when the user next goes online. In another example, the search engine computing system provides a banner advertisement with the request on a shopping application of the user. In another example, the search engine computing system places the request on a region of the user interface of the search engine computing system. In another example, the search engine computing system provides an instant message on an application, such as digital wallet application or a shopping application.

When the user provides a response with additional data to support or contradict the inventory data provided by the merchant, the additional data may be aggregated with additional data from other users. Thus, if ten users all had a similar experience searching for a product at a merchant location, then that data can be used to supplement, refine, replace, or support the merchant computing system inventory data.

For example, if a merchant computing system indicates that twenty units are available, and ten users indicate that the store was sold out, the search engine computing system can take appropriate action. For example, the search engine computing system overrides the merchant computing system data and provides a display to future users that the product is sold out. The search engine computing system may request an update from the merchant computing system with updated inventory data. The search engine computing system may display a notice to users that the merchant computing system inventory data is likely to be unreliable. Any other suitable action may be taken by the search engine computing system in response to conflicting data.

When the graphical user interface of the search engine computing system displays the inventory data that incorporates user responses, future users receive more accurate and reliable information. The improved inventory data allows users to visit merchant locations with a reasonable expectation that the desired product will be available in stock for purchase. The improved inventory data allows the merchant to receive feedback for inaccurate data. For example, the merchant may discover based on the feedback that the items in inventory are not in the proper location. Thus, while the inventory was not wrong because the merchant location did have the items, the items were not available to a user for purchase.

The inventory data may further include analytics about the inventory data. For example, by logging merchant inventory data and comparing the data to the user inputs, the search engine computing system may present information to a user in the graphical user interface related to the throughput of the products in inventory. For example, the system may predict that the products will be available for at least three more hours based on the inventory level confirmed by the user input. For example, if a user at noon provided an input that twenty units are available, a user at 1:00 PM reported fifteen units, and a user at 2:00 PM reported ten units, then the system may extrapolate the throughput to determine that the remaining ten units will likely be purchased in the next two hours. This data may be combined with the merchant inventory system to improve the throughput estimates of the merchant inventory system. In another example, the search engine computing system may present information to a user in the graphical user interface that indicates the level of accuracy of the merchant inventory data, such as 50% accurate or 90% accurate.

By using and relying on the methods and systems described herein, the search engine computing system provides improved inventory information to a user for merchant locations near the user. By displaying this information to users in a graphical user interface associated with the search engine computing system, a user is afforded the opportunity to make more informed decisions when selecting a merchant location at which to shop. The method prevents users from driving to locations that don't have an item that they are purported to have based on the data presented by the search engine computing system. The system is improved for the merchant computing systems in that they receive data from their consumers and customers. The received data may be used to improve an inventory management system, alert the merchant computing system to problems, or improve the presentation of inventory data to users. Hence, the methods and systems described herein permit accurate inventory data including forecasted inventory levels to be provided on a graphical user interface to save users time and money and to provide valuable data for merchant computing systems.

By using the user computing device of an interested party (the user who searched for the product) the technology disclosed herein requires less computing and communication resources to be deployed by the merchant when compared to computing and communications resources required for other approaches to real-time verification of inventory at the physical location. In essence, the disclosed technology crowd-sources real-time inventory verification. The technical problem that this technical solution addresses is that real-time inventory verification systems require many hardware, software and communications resources deployed at the space for each product in the merchant's physical inventory, and that frequent changes in the floor space and display configurations for each product require repeated redeployment of each of these hardware, software, and communications resources.

Example System Architectures

Turning now to the drawings, in which like numerals represent like (but not necessarily identical) elements throughout the figures, example embodiments are described in detail.

FIG. 1 is a block diagram depicting a system 100 to render graphical user interfaces to display inventory levels at a merchant location, in accordance with certain example embodiments. In some embodiments, a user 101 associated with a user computing device 110 must install an application and/or make a feature selection to obtain the benefits of the techniques described herein.

As depicted in FIG. 1, the system 100 includes network computing devices/systems 110, 130, and 140 that are configured to communicate with one another via one or more networks 105 or via any suitable communication technology.

Each network 105 includes a wired or wireless telecommunication means by which network computing devices (including devices 110, 130, and 140) can exchange data. For example, each network 105 can include a local area network ("LAN"), a wide area network ("WAN"), an intranet, an Internet, a mobile telephone network, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data. Throughout the discussion of example embodiments, it should be understood that the terms "data" and "information" are used interchangeably herein to refer to text, images, audio, video, or any other form of information that can exist in a computer-based environment. The communication technology utilized by the devices 110, 130, and 140 may be similar networks to network 105 or an alternative communication technology.

Each network computing device/system 110, 130, and 140 includes a computing device having a communication module capable of transmitting and receiving data over the network 105 or a similar network. For example, each network device 110, 130, and 140 can include a server, desktop computer, laptop computer, tablet computer, a television with one or more processors embedded therein and/or coupled thereto, smart phone, handheld or wearable computer, personal digital assistant ("PDA"), wearable devices such as smart watches or glasses, or any other wired or wireless, processor-driven device. In the example embodiment depicted in FIG. 1, the network devices 110, 130, and 140 are operated by end-users or consumers 101, merchant computing system operators, and search engine computing system operators, respectively.

The network computing device 110 is illustrated in FIG. 1 as a user computing device 110 operated by a user 101. The user computing device 110 includes a graphical user interface 114. The graphical user interface 114 may be used to display information to the user 101 to allow the user 101 to interact with the search engine computing system 140 and others. The graphical user interface 114 receives user input for queries and displays results to the user 101. The graphical user interface 114 may be provided input by the search engine computing system 140 or managed by a third party system (not pictured). The graphical user interface 114 may be accessed by the user computing device 110. The graphical user interface 114 may display the webpage 144 of the search engine computing system 140. The graphical user interface 114 may be provided by the webpage 144 of the search engine computing system 140 to the user computing device. The graphical user interface 114 may be a user interface on an application operating on the user computing device 110, such as the communication application 112.

The user 101 can utilize the communication application 112 on a user computing device 110, which may be, for example, a web browser application or a stand-alone application, to view, download, upload, or otherwise access documents or webpages via a distributed network 105. The communication application 112 can interact with servers or other computing devices connected to the network 105, including the search engine computing system server 145 of the search engine computing system 140. In an example, the communication application 112 is a web browser that accesses and displays the search engine computing system webpage 144 of the search engine computing system server 140. The communication application 112 allows the user to enter search functions for a product search, a merchant search, a merchant location search, or other suitable webpage displays. The communication application 112 may alternatively be an application that connects to the search engine computing system 140 or other systems to search for products.

The user computing device 110 also includes a data storage unit 113 accessible by the communication application 112 and one or more applications, such as a digital wallet application and an email application. The example data storage unit 113 can include one or more tangible computer-readable storage devices. The data storage unit 113 can be stored on the user computing device 110 or can be logically coupled to the user computing device 110. For example, the data storage unit 113 can include on-board flash memory and/or one or more removable memory accounts or removable flash memory. In certain embodiments, the data storage unit 113 may reside in a cloud based computing system.

The user device 110 may include a GPS application 115 that the communication application 112 may utilize to access location data for the user device 110. Examples of applications that may utilize the location data, and thus may make it available to the communication application 112, may include, but would not be limited to, Global Positioning System ("GPS") location technology or other location identifying technology of the user device, business finder applications, location based social networks, location based gaming, or a friend locater application. Additionally or alternately, the GPS application 115 may obtain location information from Wi-Fi signals, point of sale beacons, or any other suitable source.

The network computing device 130 is illustrated in FIG. 1 as a merchant computing system 130. An example merchant computing system 130 comprises merchant computing system server 135, an inventory control component 136, and a data storage unit 133.

In an example embodiment, the merchant computing system server 135 communicates with the search engine computing system 140 or other systems to transmit and receive product data, inventory data, pricing data, location data, or any other suitable data. The merchant computing system server 135 receives data from the inventory control components 136, product manufacturers or distributors, or other suitable parties (not shown). The merchant computing system server 135 provides inventory data to the search engine computing system 140 or other requestors or subscribers.

The inventory control component 136 represents any system of hardware or software that is utilized to collect, report, or analyze inventory data. The inventory control component 136 may use automated inventory collection data or manual inputs from operators. The inventory control component 136 may be logically connected to other computing systems, such as point of sale terminals, warehouse receiving terminals, manufacturer servers, or any other system or device capable of reporting the inflow or outflow of inventory. The inventory control component 136 may report inventory levels to the search engine computing system 145 or others.

In an example embodiment, the data storage unit 133 can include any local or remote data storage structure accessible to the merchant computing system 130 suitable for storing information. In an example embodiment, the data storage unit 133 stores encrypted information.

The network computing device 140 is illustrated in FIG. 1 as a search engine computing system 140. An example search engine computing system 140 comprises a search engine computing system server 145, a search engine website 144, and a data storage unit 143.

In an example embodiment, the search engine computing system server 145 communicates with the merchant computing system 130 or other systems over network 105 to request and receive inventory, merchant, and product data. The search engine computing system server 145 may receive data from the merchant computing systems 130, product manufacturers, product distributors, and other suitable parties. The search engine computing system server 145 receives inventory data from the merchant computing system 130 or other providers of inventory data.

The search engine computing system server 145 provides a webpage 144. The webpage 144 may be utilized by user 101 or others to request product data, input requested information, receive product data, display the graphical user interface data, or perform any other suitable actions. The webpage 144 may be managed or provided by the search engine computing system server 145 or any other suitable server. The webpage 144 may alternatively represent an interface on an application or other software for interacting with the user 101 via the user computing device 110.

The data storage unit 143 can include any local or remote data storage structure accessible to the search engine computing system 140 suitable for storing information. In an example embodiment, the data storage unit 143 stores encrypted information.

It will be appreciated that the network connections shown are examples and other means of establishing a communications link between the computers and devices can be used. Moreover, those having ordinary skill in the art having the benefit of the present disclosure will appreciate that the merchant computing system 130, search engine computing system 140, and the user computing device 110 illustrated in FIG. 1 can have any of several other suitable computer system configurations. For example, a user computing device 110 can be embodied as a mobile phone or handheld computer, and may not include all the components described above.

Figure 7:
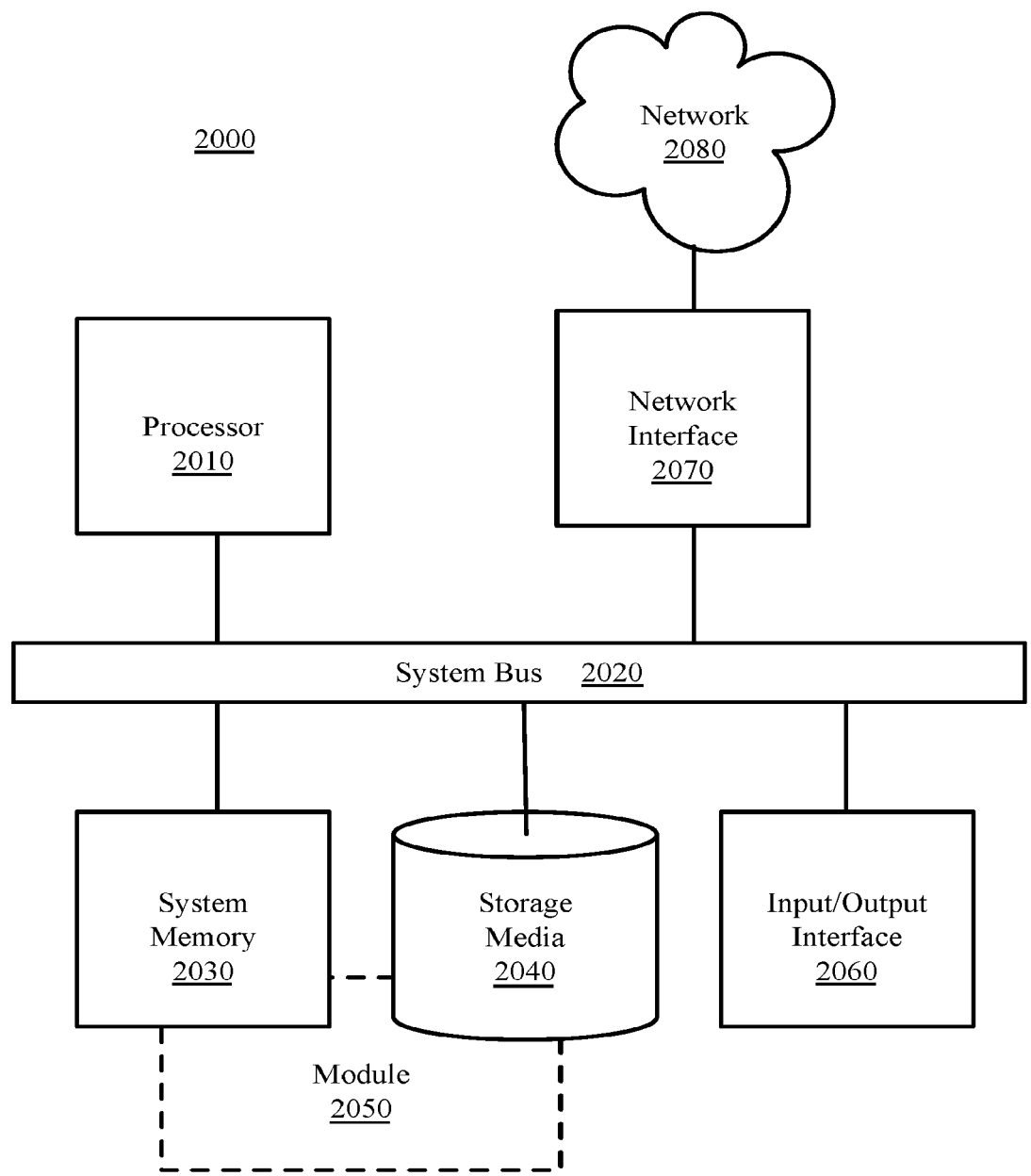
FIG. 7 is a block diagram depicting a computing machine and a module, in accordance with certain example embodiments.

In examples, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein, may by any of the components discussed in more detail with respect to FIG. 7. The computing machines discussed herein may communicate with one another, as well as with other computing machines or communication systems over one or more networks, such as network 105. The network 105 may include any type of data or communications network, including any of the network technology discussed with respect to FIG. 7.

Example Processes

The example methods illustrated in FIG. 2-5 are described hereinafter with respect to the components of the example operating environment 100. The example methods of FIG. 2-5 may also be performed with other systems and in other environments.

Figure 2:
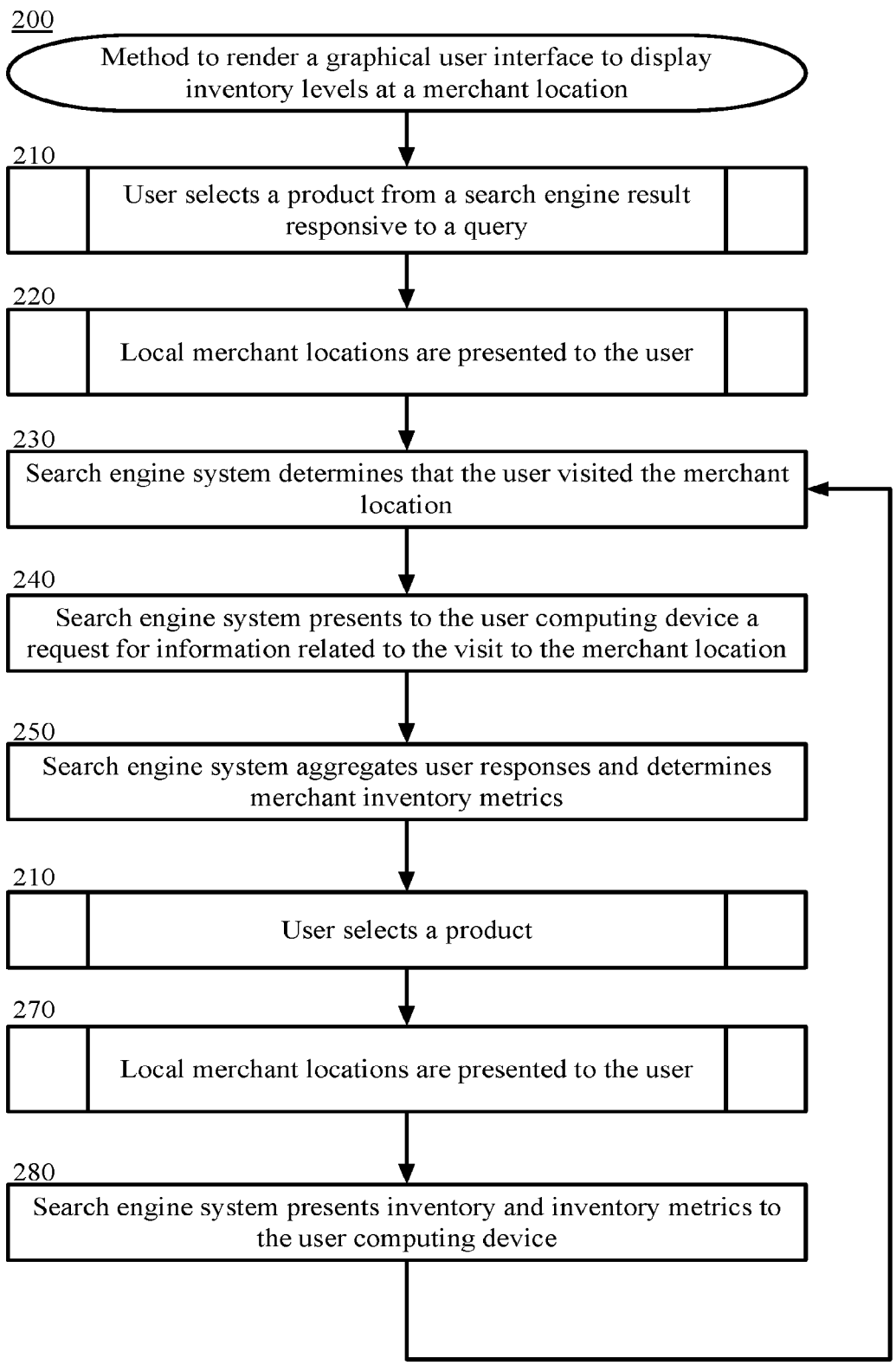
FIG. 2 is a block flow diagram depicting a method to render graphical user interfaces to display inventory levels at a merchant location, in accordance with certain example embodiments.

FIG. 2 is a block flow diagram depicting a method 200 to render graphical user interfaces to display inventory levels at a merchant location, in accordance with certain example embodiments.

With reference to FIGS. 1 and 2, in block 210, a user 101 selects a product from a search engine computing system 140 result responsive to a query. The details of block 210 are explained in greater detail in method 210 in FIG. 3.

Figure 3:
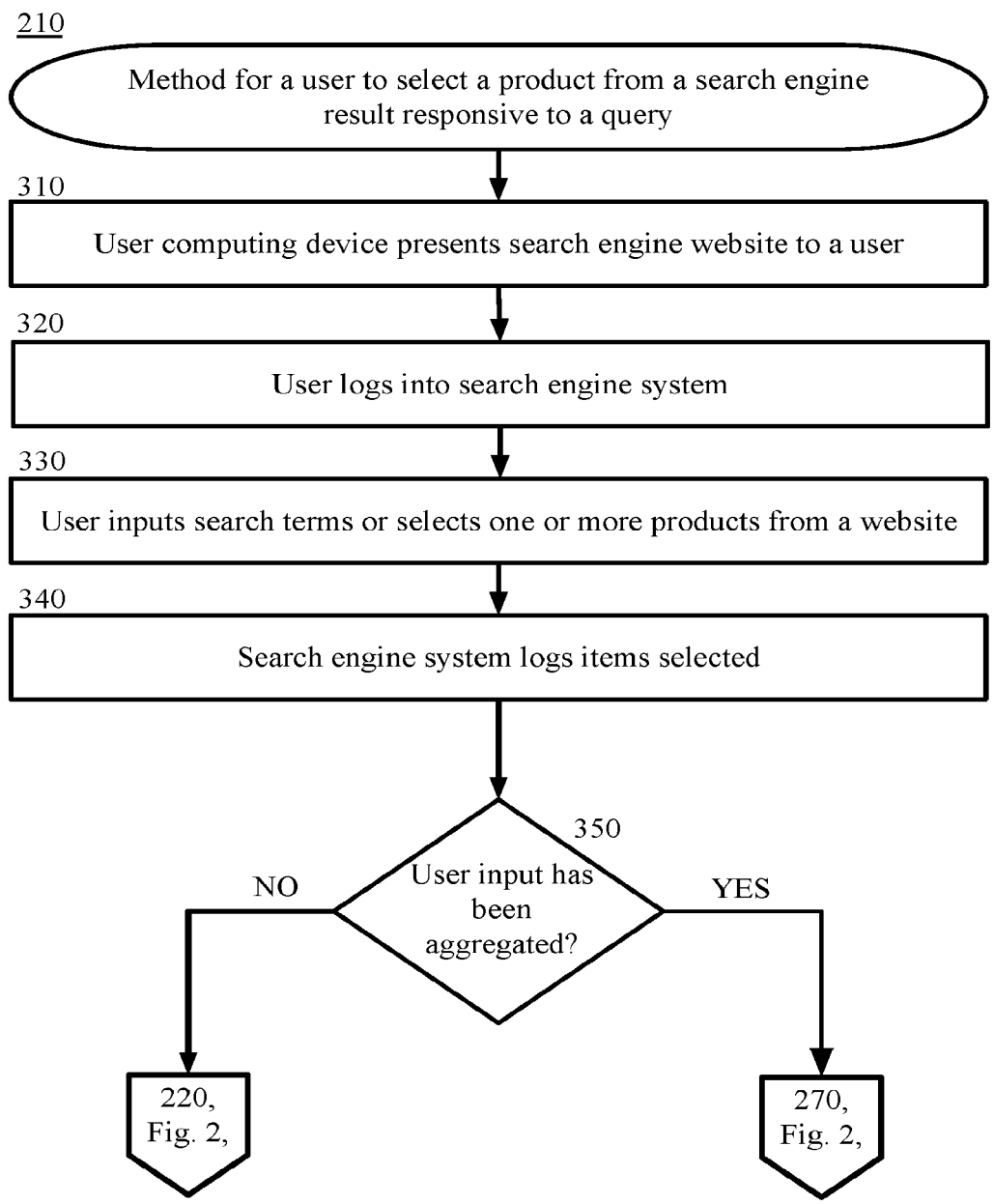
FIG. 3 is a block flow diagram depicting a method for a user to select a product from a query result on a search engine computing system, in accordance with certain example embodiments.

FIG. 3 is a block flow diagram depicting a method 210 for a user 101 to select a product from a query result on a search engine computing system 140, in accordance with certain example embodiments. In block 310, a user computing device 110 presents a search engine website 144 to a user 101. The user computing device 110 presents a graphical user interface 114 to the user 101 to allow the user 101 to interact with the search engine computing system 140 to conduct queries, select results, or perform other suitable functions. The graphical user interface 114 may present instruction code or other instructions to the user computing device 110 to display the graphical user interface 114. The graphical user interface 114 may be provided by a third party source. Any suitable method of providing the graphical user interface 114 may be employed.

In block 320, the user 101 logs into the search engine computing system 140. For example, the user 101 may actuate a "Sign In" function of the search engine computing system 140. The search engine computing system 140 may import an authentication of the user 101 from another application to which the user 101 is signed in. Any other manner of authenticating the user 101 may be used. The purpose of the authenticating the user 101 is to allow the search engine computing system 140 to compare the user search history with the user input and user location history as described herein.

In block 330, the user 101 enters a search query into a search element on the graphical user interface 114. For example, the user 101 may enter a product query complete with a product name and model number, such as "BRAND X cordless drill model D-abc123." The user 101 may enter a more generic query such as "Brand X drills" or "cordless drills." The user 101 additionally may enter a request for local store results, online merchant results, or any other suitable queries. The user 101 may alternatively submit a query in any other suitable fashion. For example, the user 101 may enter the query by selecting on a presented link or other preconfigured query. For example, if the user history indicates that the user 101 is interested in cordless tools, a search query for "cordless drills" may be presented to the user 101 on the graphical user interface 114 as a likely query.

In block 340, the search engine computing system 140 logs the items selected by the user 101. For example, if the user selects a link on one of the results displayed on the graphical user interface 114, then the search engine computing system 140 logs the selection. The search engine computing system 140 logs the product associated with the selection as an item that the user 101 may be interested in purchasing. If the product search was specific enough to identify a particular product, the search engine computing system 140 logs that product as one in which the user 101 is interested. In another example, the user 101 selects an option to go to a webpage of a merchant computing system 130 that is selling the product in the search query. For example, the user 101 may be presented a particular merchant, "Giant Hardware," in the query results. If the user 101 clicks a link to go to that page, or in some other way subsequently visits that page, then the search engine computing system 140 logs the product as one in which the user 101 may be interested. Any other action taken by the user 101 may be logged to record the interest of the user 101 in the product from the search.

In block 350, the search engine computing system 140 determines if user input has been aggregated and incorporated into the inventory data as described herein. If user input has been aggregated and incorporated into the inventory data, then the method 210 proceeds to block 270 of FIG.

2. If user input has not been aggregated and incorporated into the inventory data and only inventory data from the merchant system 130 is available for display to the user 101, then the method 210 proceed to block 220 of FIG. 2.

Returning to FIG. 2, in block 220 of FIG. 2, a list of local merchant options is presented to the user 101. The details of block 220 are explained in greater detail in method 220 in FIG. 4.

Figure 4:
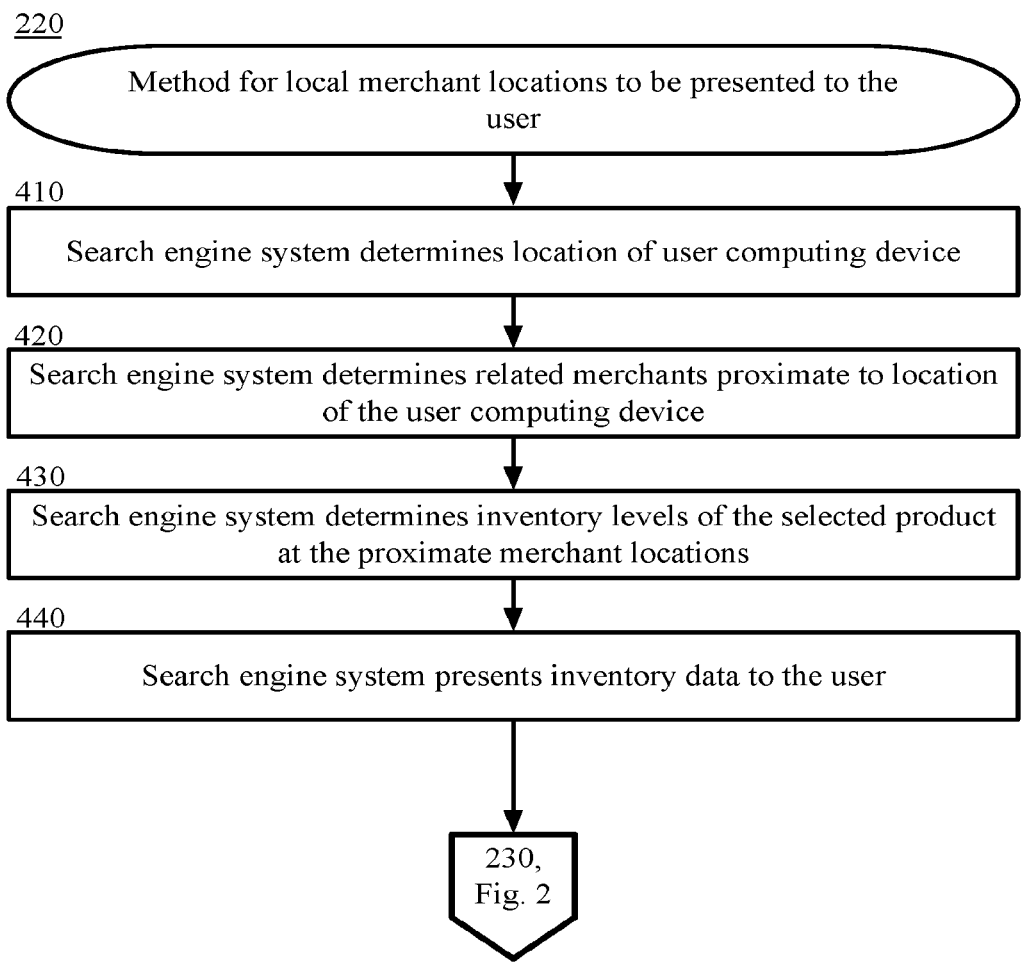
FIG. 4 is a block flow diagram depicting a method to present local merchant locations on a graphical user interface, in accordance with certain example embodiments.

FIG. 4 is a block flow diagram depicting a method 220 for local merchant locations to be presented on a graphical user interface 114, in accordance with certain example embodiments.

In block 410, the search engine computing system 140 determines a location of the user computing device 110. The location of the user 101 may be based on any suitable input from the user computing device 110 or other computing device. For example, a GPS application 115 on the user computing device 110 may provide location data. In another example, the user computing device 110 or the GPS application 115 may use Wi-Fi signals, merchant beacons, or any other suitable data to determine a location. In another example, the user 101 may input a location, such as a by a check-in application or a social media application. The search engine computing system 140 may use login information of the user 101 on the user computing device, on the search engine computing system 140, on the GPS application 115, or on other software or hardware to correlate the user search history with the user location history.

In block 420, the search engine computing system 140 determines related merchant locations proximate to location of the user computing device 110. Based on the location of the user computing device 110, the search engine computing system 140 may access a database, access a mapping application, access a third party service, or perform any suitable actions to identify local brick and mortar merchants around the user computing device 110. For example, the search engine computing system 140 may access a database that lists the latitude and longitude of merchant locations, compare the list to the location of the user computing device 110, and identify all merchant locations that are within a configured distance of the user computing device 110, such as 1 mile, 5 miles, or 20 miles.

In block 430, the search engine computing system 140 determines inventory levels of the selected product at the proximate merchant locations. The inventory levels may be obtained from any suitable source. For example, the inventory level may be obtained by communicating a request to an inventory control component 136 operating on or in conjunction with a merchant computing system 130 associated with a merchant location. For example, the search engine computing system 140 transmits a request over the network 105 to an inventory control component 136 to supply inventory data for the merchant location along with any marketing data, such a price, a picture, a full model number, a description, or any other desired data. In another example, the request for inventory data is obtained from a website of the merchant computing system 130. In another example, the inventory control component 136 periodically updates a database of inventory data that is stored in a location accessible to the search engine computing system 140, such as a third party server or on the search engine computing system server 145. The inventory data may be stored by the inventory control component 136 and continuously or periodically updated. In another example, the inventory data is determined at the time of the request from the search engine computing system 140.

The inventory level supplied by the inventory control component 136 or the merchant computing system 130 may be based on any suitable inventory system. For example, the merchant computing system 130 may employ a commercially available inventory management system that logs products that are delivered to the merchant location for sale and products that are sold from the store. The merchant computing system 130 may use a manual system wherein merchant operators periodically count the products in inventory. Any other suitable inventory system, such as the inventory control component 136, or a combination of inventory systems, may be used.

In block 440, the search engine computing system 140 presents the inventory data to the user 101 on the graphical user interface 114. For example, the search engine computing system 140 presents a results page to the user 101 on the graphical user interface 114 of the user computing device 110. The results page may list local merchants that have the product in inventory based on the inventory levels supplied in block 430. The results may be provided in a list view or a map view of the graphical user interface 114. From block 440, the method 220 returns to block 230 of FIG. 3.

In block 230, the search engine computing system 140 determines that the user 101 visited the merchant location. The search engine computing system 140 logs locations visited by the user 101. The location of the user 101 may be based on any suitable input from the user computing device 110 or other computing device. For example, a GPS application 115 on the user computing device 110 may provide location data that the search engine computing system 140 logs. In an example, the GPS application 115 may provide the location history to the search engine computing system 140, and the search engine computing system 140 compares the location history with a database of merchant locations to determine a list of local merchants that the user 101 has visited. In another example, the user computing device 110 or the GPS application 115 may use Wi-Fi signals, merchant beacons, or any other suitable data to determine locations. In another example, the user 101 may input locations visited, such as a with a check-in application or a social media application.

In block 240, the search engine computing system 140 presents to the user computing device 110 a request for information related to the visit to the merchant location. The request may be communicated to the user 101 in any suitable manner. For example, the search engine computing system 140 provides a questionnaire, survey, or other request for information to a user 101 that has searched for a product and visited the associated merchant location. For example, the search engine computing system 140 provides a pop-up advertisement with the request to the user 101 when the user next goes online on the user computing device 110. In another example, the search engine computing system 140 provides a banner advertisement with the request on a shopping application on the user computing device 140. In another example, the search engine computing system 140 places the request on a region of the graphical user interface 114 of the search engine computing system 140. For example, if the display is divided into regions, one region may display a request for the user 101 to complete the questionnaire. In another example, the user 101 is provided with the request by an instant message or other messaging function on an application on the user computing device 110, such as a digital wallet application, a shopping application, or a social media application. In another example, the user 101 is provided with the request via email, text, or in any other suitable manner.

In block 250, the search engine computing system 140 aggregates user responses and determines merchant inventory metrics. When the user 101 provides a response with additional data to support or contradict the inventory data provided by the merchant computing system 130, the data may be aggregated with the data of other users. Therefore, if ten users all had a similar experience searching for a product at a merchant location, then that data can be used to supplement, refine, replace, or support the merchant computing system inventory data.

When the graphical user interface 114 of the search engine computing system displays the inventory data that incorporates user responses, future users receive more accurate and reliable information. The improved inventory data allows users 101 to visit merchant locations with a reasonable expectation that the desired product will be available in stock for purchase. The improved inventory data allows the merchant computing system 130 to receive feedback for inaccurate data. For example, the merchant computing system 130 may discover based on the feedback that the items in inventory are not in the proper location. Thus, while the inventory was not wrong, the items were not available to user for purchase.

For example, if the inventory data of a merchant computing system 130 indicates that twenty units are available, and ten users indicate that the store was sold out, then the search engine computing system can take appropriate action. For example, the search engine computing system may override the merchant computing system data and provide a display to future users that the product is sold out. The search engine computing system 140 may request an update from the merchant computing system 130 with updated inventory data to verify that that the condition has been addressed. The search engine computing system 140 may display a notice to the user 101 that the merchant computing system inventory data is likely to be unreliable. Any other suitable action may be taken by the search engine computing system in response to conflicting data.

The search engine computing system 140 may further perform analytics on the inventory data combined with the user data. For example, by logging merchant inventory data and comparing the data to the user inputs, the search engine computing system 140 may present information to a user 101 on the graphical user interface 114 related to the throughput of the products in inventory. For example, the system may predict that the products will be available for at least three more hours based on the inventory level confirmed by the user input. For example, if a user 101 at noon provided an input that twenty units are available, a different user at 1:00 PM reported fifteen units, and another different user at 2:00 PM reported ten units, then the search engine computing system 140 may extrapolate the throughput to determine that the remaining ten units will likely be purchased in the next two hours.

In another example, the search engine computing system 140 may compare the stock reported by the merchant inventory data to the user input based on the amount of time between the reporting and the user observation. In an example, the merchant computing system 130 reported ten units available at noon at the time of a user 101 search query, and the user 101 responded to a user request that the merchant location had 6 units during a user 101 visit to the location at 2:00 PM. The search engine computing system 140 may determine that the merchant location is likely selling two units per hour. The search engine computing system 140 may further predict that the merchant location will likely be out of stock in three more hours at the current rate.

In another example, the search engine computing system 140 may determine how often the merchant inventory data matches the user input. For example, if the inventory data and the user input match 90% of the time, then the search engine computing system 140 may display on the graphical user interface 114 that the inventory data is accurate 90% of the time. Alternatively, the search engine computing system 140 may use that data to determine that based on the throughput data of the merchant location, that a product is 90% likely to be available for the predicted amount of time.

In another example, the search engine computing system 140 determines how the merchant inventory data changes over time. For example, if the merchant inventory accuracy improves from 50% in month one to 70% in month two to 90% in month three, then the search engine computing system 140 may update the accuracy prediction accordingly. The search engine computing system 140 may further inform the merchant computing system 130 of the improving accuracy so that the merchant computing system 130 is able to determine the causes of the improved accuracy. In another example, the search engine computing system 140 determines that the accuracy is declining. The search engine computing system 140 may provide a warning on the graphical user interface 114 of the declining accuracy and further warn the merchant computing system 130 of the decline.

In another example, the search engine computing system 140 analyses the user input to identify outlier input. For example, if fifty users reported that the inventory reported by the merchant computing system 130 was accurate, and the user 101 reported that the inventory reported by the merchant computing system 130 was inaccurate, then the user 101 input may be determined to be an outlier. The user 101 may provide outlier input for any number of reasons, such as the user 101 misunderstood the inventory data, the user 101 went to the wrong store, the user 101 intentionally provided incorrect data, or for any other suitable reason. The search engine computing system 140 may note the outlier input and discount the input. In another example, the search engine computing system 140 may flag the user 101, and determine if the user 101 often provides outlier input. If so, then the search engine computing system 140 may discount future input from the user 101. The search engine computing system 140 may generate a reliability score for the user 101 based on their input compared to the consensus of other users. If the user 101 has a low reliability score, then the search engine computing system 140 may weigh the input from the user 101 less than the input from a user with a higher reliability score.

In another example, the search engine computing system 140 determines a configured number of units in inventory that would be considered to be "ample," wherein the term ample herein represents that the number of items available is greater than the expected requirements, and thus product will likely be available for purchase. For example, based on the size of the store, the usage rate of the product, the time of day, the frequency of inventory replenishment, and other factors, a number of units in inventory that would ensure that a unit would likely be available to a user 101 is determined. For example, in a small store that typically sells five units per week, and replenishes the store's inventory every three days, an inventory of six units would be considered to be an ample inventory. In this example, the search engine computing system 140 may display on the graphical user interface 114 that "ample units are available at this merchant." Any other terminology to communicate that a surplus of units are available may be used. If the small store only had one unit available and sells five units per week, then the inventory would be determined to be "not ample."

From block 250, the method 200 proceeds back to block 210. In block 210, the user 101 selects a product to search on the search engine computing system 140 as described herein. In this example, the product is searched after the questionnaires have been communicated, user input has been received, and the user input has been incorporated in to the product inventories. The features of block 210 are described in greater detail in the method 210 of FIG. 3 as described herein.

Returning to FIG. 2, in block 270, the local merchant locations are presented to the user 101. The features of block 270 are described in greater detail in the method 270 of FIG. 5.

Figure 5:
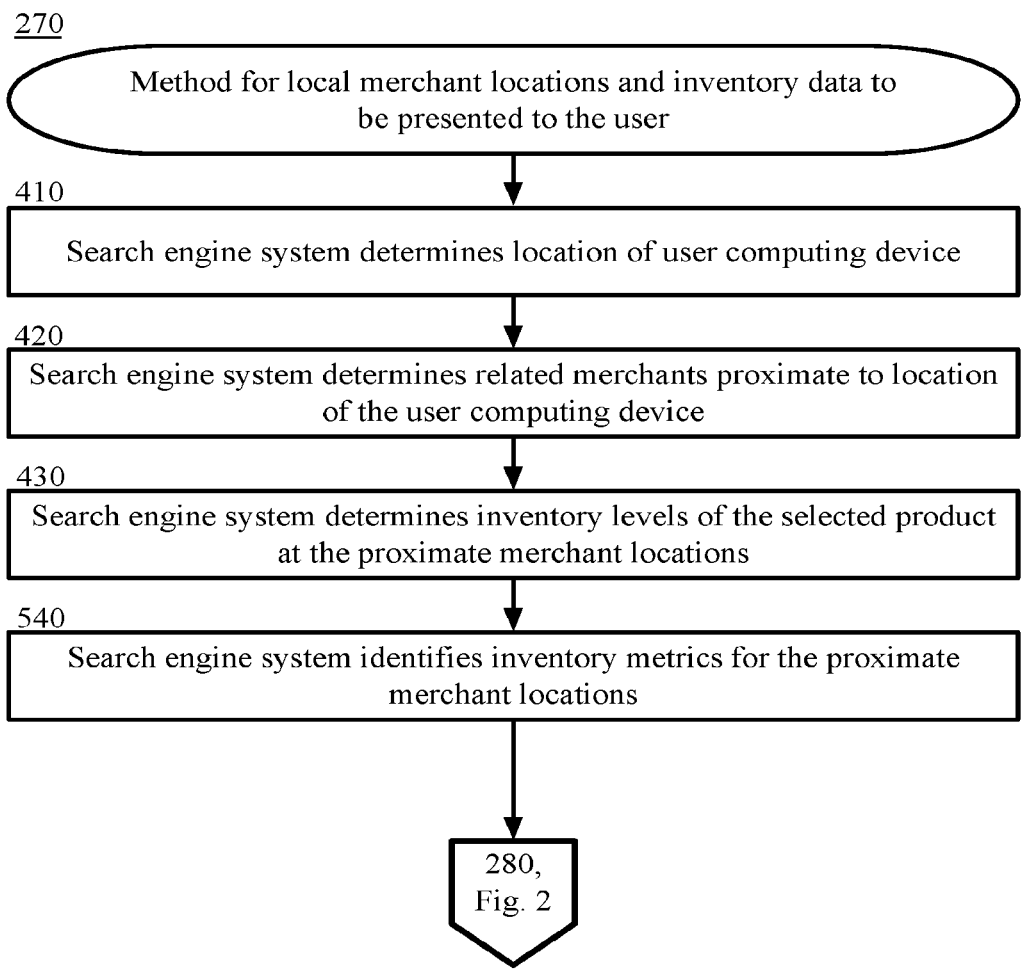
FIG. 5 is a block flow diagram depicting a method to present local merchant locations and inventory data on a graphical user interface, in accordance with certain example embodiments.

FIG. 5 is a block flow diagram depicting a method for local merchant locations and inventory data to be presented to the user 101 on a graphical user interface 114, in accordance with certain example embodiments.

Blocks 410, 420, and 430 are performed substantially the same as Blocks 410, 420, and 430 with respect to FIG. 4.

In Block 540, the search engine computing system 140 identifies inventory metrics for the proximate merchant locations. The search engine computing system 140 identifies the accuracy, reliability, timeliness, and other characteristics of the inventory data incorporating the user input as described in block 250 of FIG. 2. The search engine computing system 140 determines the most appropriate metric to supply to the user 101. In an example, the search engine computing system 140 determines that a big box merchant location near the user 101 that has fifty of the searched items in inventory. The search engine computing system 140 determines based on the contents of the search and other search history of the user 101 that the user 101 would not be interested in the exact number, but merely if one is available for purchase. The search engine computing system 140 in that circumstance might only provide a user 101 with a statement that the merchant location has "ample" inventory.

In another example, the search engine computing system 140 determines that a user 101 would find the accuracy of the merchant supplied inventory to be useful if the accuracy were below 70%. Thus, when the metrics indicate that the accuracy is 50%, the display on the graphical user interface 114 to the user 101 may indicate that "the inventory for this merchant is only correct 50% of the time."

In another example, a likelihood that a merchant will have a product in inventory may be based on a calculation or an algorithm based on the number of products inventory, the rate at which a the products are being sold, the typical accuracy of the merchant location's inventory levels, and/or any other suitable factors. The likelihood may be expressed in a percentage likelihood that a product will be available, a general yes/no prediction that the product is likely to be in inventory, or any other suitable expression of likelihood. For example, the search engine computing system 140 determines that a merchant location has seven items in inventory, and the user input indicates that the merchant is selling five units per hour. The search engine computing system 140 determines that the user 101 would find this data useful and displays on the graphical user interface 114 "this merchant is likely to have this item in stock for approximately one more hour." That is, the product inventory after one hour will likely be around two units. Therefore, the user 101 should purchase the product within the next hour or the product will likely be nearly depleted. Alternatively, the likelihood in this example may be expressed as "75% likely to have this item in stock for one more hour." This 75% likelihood may be calculated based on the calculated accuracy of the inventory levels and/or the accuracy of the depletion rate of the inventory.

From block 540, the method 270 returns to block 280 with respect to FIG. 2.

In block 280, the search engine computing system 140 presents the inventory data and inventory metrics to the user 101 on the graphical user interface 114. For example, the search engine computing system 140 presents a results page to the user 101 on the graphical user interface 114 of the user computing device 110. The results page may list local merchants that have the product in inventory based on the inventory levels supplied in block 430. The results may be provided in a list view or a map view of the graphical user interface 114. The display to the user 101 on the graphical user interface 114 includes the inventory metrics that the search engine computing system 140 determines to be most relevant to the user 101. The details of the display are illustrated in FIG. 6.

Figure 6:
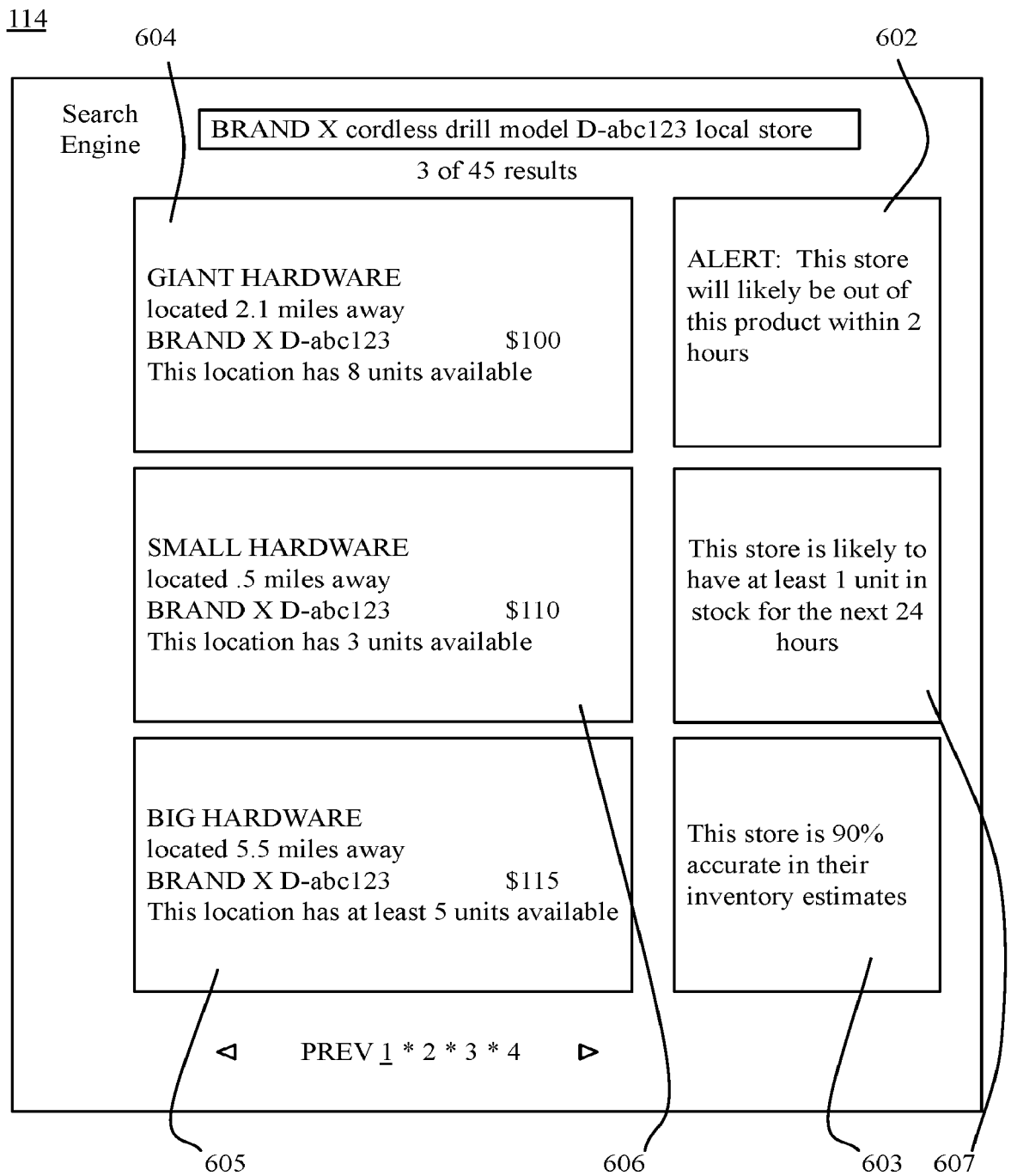
FIG. 6 is an illustration of an example graphical user interface displaying local merchant locations and inventory data, in accordance with certain example embodiments.

FIG. 6 is an illustration of an example graphical user interface 114 displaying local merchant locations and inventory data, in accordance with certain example embodiments. The example illustrated is a results page from a search on a search engine computing system 140 for a "BRAND X cordless drill model D-abc123 local store." Thus, results are directed to a specific model of cordless drill and inventories at local merchant locations.

The first result 604 indicates that the drill is located at Giant Hardware for $100 dollars and that eight units are indicated as available. The eight unit estimate is based on the inventory data received from Giant Hardware and may be modified based on user input. For example, if Giant Hardware indicated that they have ten units available, but user inputs from ten users indicate that the actual number is consistently two units lower, then the number of units displayed may be adjusted down to eight.

The metric display 602 for Giant Hardware provides an alert that "this store will likely be out of this product within 2 hours." This alert may also be based on the throughput rate derived from the inventory data received from Giant Hardware and may be modified based on user input.

The second result 606 indicates that the drill is located at Small Hardware for $110 dollars and that three units are indicated as available. The three unit estimate is based on the inventory data received from Small Hardware and may be modified based on user input. For example, if Small Hardware indicated that they have three units available, and Small Hardware is accurate 95% of the time, then the units available is not adjusted.

The metric display 607 for Small Hardware provides an alert that "this store is likely to have at least 1 unit in stock for the next 24 hours." This alert may also be based on the inventory data received from Small Hardware and may be modified based on user input indicating that Small Hardware typically sells about one unit per day.

The third result 605 indicates that the drill is located at Big Hardware for $115 dollars and that at least five units are indicated as available. The five unit estimate is based on the inventory data received from Big Hardware and may be modified based on user input. For example, if Big Hardware indicated that they have five units available, but ten user inputs indicate that the actual number is consistently accurate or one to two units low, then the number of units may be displayed as "at least 5."

The metric display 603 for Big Hardware provides an alert that "this store is 90% accurate in their inventory estimates." This alert may also be based on the inventory data received from Big Hardware and may be modified based on user input.

Returning to FIG. 2, from block 280, the method 200 returns to block 210 of FIG. 2. That is, when the user 101 visits one of the displayed merchant locations, the search engine computing system 140 may recognize the visit and communicate a new request for user inventory input, as described herein. The updated inventory data and inventory metrics are provided to the user 101 after a subsequent product search or to subsequent users as described herein.

In another example, the method 200 may be employed with an online transaction with an online merchant. Many of the features described in the methods herein would be applied to an online transaction. For example, instead of the inventory levels of nearby merchant locations being shown in response to the product query, the inventory levels of online merchants are displayed along with prices and links to a website. When the user 101 attempts to purchase the searched item at an online merchant, the search engine computing system 140 recognizes the attempt. Instead of using GPS application 115 of a user computing device 110 to determine if the user 101 visited a merchant location, the search engine computing system 140 uses the online actions of the user 101 on the user computing device 110 or another computing device.

The search engine computing system 140 sends a questionnaire to the user computing device as described herein to determine if the inventory for the online merchant that was displayed on the graphical user interface 114 was accurate. The user 101 may respond with the observed inventory at the online merchant. For example, if the user 101 observed on the website of the online merchant that ten units of the product were available for purchase, then the user 101 may report that observation. In another example, the user 101 may not observe how many units were actually available, but they report if a unit was purchased and delivered or if the transaction was denied. That is, the user 101 may only be able to report that the number of units purchased by the user 101 were actually available. For example, if the online merchant indicated in the query results from the search engine computing system 140 that ten units of the product were available and the user 101 reported that ten units were not available for purchase, then the search engine computing system 140 adjusts the inventory display for the online merchant as described herein. Any other suitable functions described in method 200 may be applied to an online transaction.

Example Systems

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a wearable computer, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read-only memory ("CD-ROM"), a digital versatile disc ("DVD"), a Blu-ray disc, a magnetic tape, a flash memory, other non-volatile memory device, a solid sate drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to render a graphical user interface to display inventory data, comprising:
by one or more computing devices:
receiving inventory data from one or more merchant computing systems that are each associated with one or more merchants;
receiving, from a user computing device, a product search request comprising a product query for a product;
selecting one or more merchants that have the product associated with the product query in inventory;
communicating, to the user computing device, product data comprising the one or more merchants that have the product in inventory and a number of units of the product available for sale at each of the one or more merchants;
determining a location of the user computing device associated with the product search request;
in response to determining that the user computing device was proximate to a physical location associated with a particular merchant of the one or more merchants after the product data was presented on the user computing device, communicating, to the user computing device, a request to verify the number of units of the product available for sale at the physical location of the particular merchant;
aggregating a verification from the user computing device with verifications from one or more other user computing devices; and
based on a comparison of the inventory data from the merchant computing system associated with the particular merchant and the one or more aggregated verifications, updating the inventory data received from the merchant computing system to reflect the number of units of the product available for sale at the physical location of the particular merchant.

2. The computer-implemented method of claim 1, wherein the one or more merchants comprise physical merchant locations and online merchants.

3. The computer-implemented method of claim 1, wherein communicating the request to verify the number of units of the product available for sale at the physical location of the particular merchant further comprises determining that the user computer device accessed a website associated with the particular merchant.

4. The computer-implemented method of claim 1, wherein communicating the request to verify the number of units of the product available for sale at the physical location of the particular merchant comprises communicating the request to verify the number of units of the product available for sale at the physical location of the particular merchant for display on a graphical user interface of the user computing device.

5. The computer-implemented method of claim 1, wherein the request to the user computing device is presented via the user computing device in one or more of a popup advertisement, a banner advertisement, or an instant message.

6. The computer-implemented method of claim 1, further comprising:
communicating, to the user computing device, a notification that an amount of inventory at the particular merchant is ample when the number of units of the product available for sale at the physical location of the particular merchant is greater than an expected requirement for the particular merchant; and
communicating, to the user computing device, a notification that the amount of inventory at the particular merchant is not ample when the number of units of the product available for sale at the physical location of the particular merchant is less than an expected requirement for the particular merchant.

7. The computer-implemented method of claim 1, further comprising calculating inventory metrics associated with the particular merchant, including calculating an accuracy of the inventory data from the merchant computing system as compared to one or more aggregated verifications.

8. The computer-implemented method of claim 7, wherein calculating inventory metrics associated with the particular merchant further comprises:
based on the one or more aggregated verifications, calculating a rate at which the number of units of the product is decreasing; and
based on the rate at which the number of products is decreasing, calculating a likelihood that the particular merchant will have at least one unit of the product available for sale within a given period of time.

9. The computer implemented method of claim 7, further comprising:
receiving, from a second user computing device, a subsequent product query; and
communicating, to the second user computing device, subsequent product data, the subsequent product data comprising the particular merchant that has the product in inventory, the updated number of units of the product available for sale at the physical location of the particular merchant, and the inventory metrics.

10. A computing system to render a graphical user interface to display inventory data, comprising:
one or more processors; and one or more tangible, non-transitory, computer readable media that collectively store instructions that when executed by the one or more processors cause the computing system to perform operations, the operations comprising:
- receiving inventory data from one or more merchant computing systems that are each associated with one or more merchants;
- receiving, from a user computing device, a product search request comprising a product query for a product;
- selecting one or more merchants that have the product associated with the product query in inventory;
- communicating, to the user computing device, product data comprising the one or more merchants that have the product in inventory and a number of units of the product available for sale at each of the one or more merchants;
- determining a location of the user computing device associated with the product search request;
- in response to determining that the user computing device was proximate to a physical location associated with a particular merchant of the one or more merchants after the product data was presented on the user computing device, communicating, to the user computing device, a request to verify the number of units of the product available for sale at the physical location of the particular merchant;
- aggregating a verification from the user computing device with verifications from one or more other user computing devices; and
- based on a comparison of the inventory data from the merchant computing system associated with the particular merchant and the one or more aggregated verifications, updating the inventory data received from the merchant computing system to reflect the number of units of the product available for sale at the physical location of the particular merchant.

11. The computing system of claim 10, wherein the one or more merchants comprise physical merchant locations and online merchants.

12. The computing system of claim 10, wherein communicating the request to verify the number of units of the product available for sale at the physical location of the particular merchant further comprises determining that the user computer device accessed a website associated with the particular merchant.

13. The computing system of claim 10, wherein communicating the request to verify the number of units of the product available for sale at the physical location of the particular merchant comprises communicating the request to verify the number of units of the product available for sale at the physical location of the particular merchant for display on a graphical user interface of the user computing device.

14. The computing system of claim 10, further comprising calculating inventory metrics associated with the particular merchant by:
- based on the one or more aggregated verifications, calculating a rate at which the number of units of the product is decreasing; and
- based on the rate at which the number of products is decreasing, calculating a likelihood that the particular merchant will have at least one unit of the product available for sale within a given period of time.

15. The computing system of claim 10, further comprising:
- receiving, from a second user computing device, a subsequent product query; and
- presenting, on a second user computing device, subsequent product data, the subsequent product data comprising the particular merchant that has the product in inventory, the updated number of units of the product available for sale at the physical location of the particular merchant, and inventory metrics.

16. A non-transitory, computer-readable medium that stores instructions that, when executed by one or more processors of one or more computing devices, cause the one or more computing devices to perform operations, the operations comprising:
- receiving inventory data from one or more merchant computing systems that are each associated with one or more merchants;
- receiving, from a user computing device, a product search request comprising a product query for a product;
- selecting one or more merchants that have the product associated with the product query in inventory;
- communicating, to the user computing device, product data comprising the one or more selected merchants that have the product in inventory and a number of units of the product available for sale at each of the one or more selected merchants;
- determining a location of the user computing device associated with the product search request;
- in response to determining that the user computing device was proximate to a physical location associated with a particular merchant of the one or more merchants after the product data was presented on the user computing device, communicating, to the user computing device, a request to verify the number of units of the product available for sale at the physical location of the particular merchant;
- aggregating a verification from the user computing device with verifications from one or more other user computing devices; and
- based on a comparison of the inventory data from the merchant computing system associated with the particular merchant and the one or more aggregated verifications, updating the inventory data received from the merchant computing system to reflect the number of units of the product available for sale at the physical location of the particular merchant.

17. The non-transitory, computer-readable medium of claim 16, wherein the one or more merchants comprise physical merchant locations and online merchants.

18. The non-transitory, computer-readable medium of claim 16, wherein communicating the request to verify the number of units of the product available for sale at the particular merchant further comprises determining that the user computer device accessed a website associated with the particular merchant.

19. The non-transitory, computer-readable medium of claim 16, further comprising calculating inventory metrics associated with the particular merchant by:
- based on the one or more aggregated verifications, calculating a rate at which the number of units of the product is decreasing; and
- based on the rate at which the number of products is decreasing, calculating a likelihood that the particular merchant will have at least one unit of the product available for sale within a given period of time.

20. The non-transitory, computer-readable medium of claim 16, further comprising:
- receiving, from a second user computing device, a subsequent product query; and presenting, on the second user computing device, subsequent product data, the subsequent product data comprising the particular merchant that has the product in inventory, the updated number of units of the product available for sale at the physical location of the particular merchant, and inventory metrics.

\* \* \* \* \*